Figure 1:
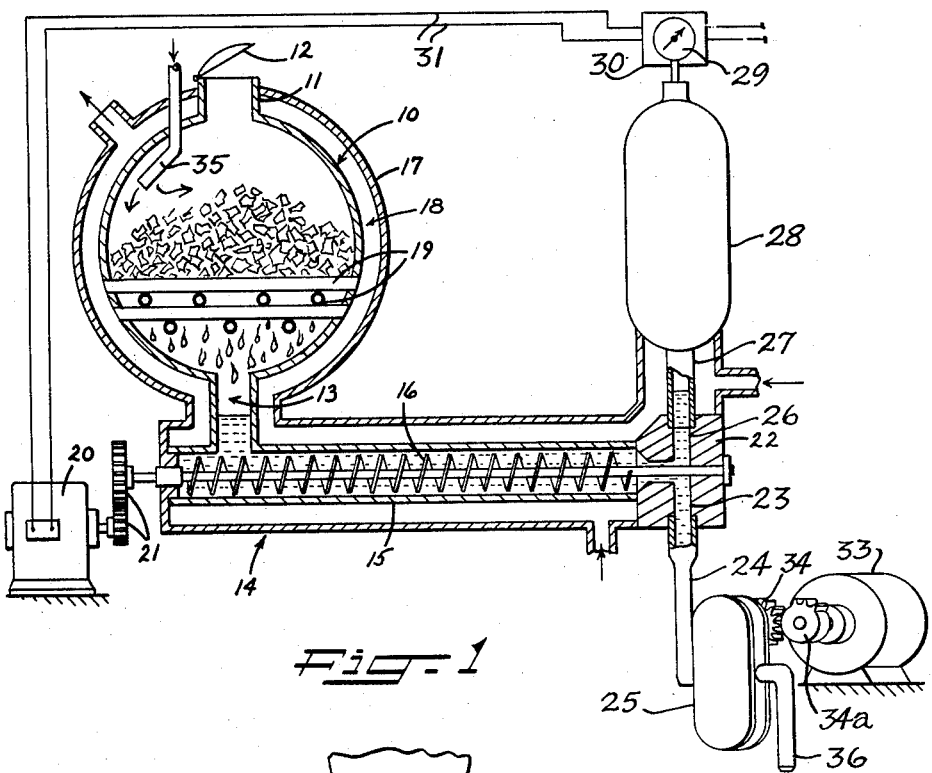

Feb. 10, 1959 W. E. MEISSNER 2,872,763
PROCESS AND APPARATUS FOR PACKAGING FLOWABLE MATERIALS
Filed Dec. 24, 1953 2 Sheets-Sheet 1

INVENTOR:
William E. Meissner

Feb. 10, 1959     W. E. MEISSNER     2,872,763
PROCESS AND APPARATUS FOR PACKAGING FLOWABLE MATERIALS
Filed Dec. 24, 1953     2 Sheets-Sheet 2

INVENTOR:

William E. Meissner

2,872,763

Patented Feb. 10, 1959

United States Patent Office

2,872,763

PROCESS AND APPARATUS FOR PACKAGING FLOWABLE MATERIALS

William E. Meissner, New York, N. Y., assignor to American Viscose Corporation, Philadelphia, Pa., a corporation of Delaware Application December 24, 1953, Serial No. 400,293

4 Claims. (Cl. 53—29)

This invention relates to the packaging of flowable materials and in particular to a process and apparatus for packaging such materials and to the package so produced.

In general, flowable materials such as liquids and pastes are packaged by simultaneously forming a molten plastic mass of a thermoplastic film-forming material into a container and filling the container with the flowable material. In this embodiment, it should be noted that the flowable material itself is utilized as a force for expanding the film-forming plastic mass into the container. In a second embodiment, the plastic mass of film-forming material is first formed into a container by expanding it by use of the pressure of a gas and thereafter the gas is displaced and the container filled with the flowable material. In each of the above embodiments, the primary plastic container thus produced may be used as the sole plastic container for the flowable material and further the plastic container so filled may be subjected to cooling, chilling or freezing for storage, preservation and shipment. In a further embodiment, the plastic container is formed within the walls of a self-supporting surrounding receptacle which may be a carton, box, shell, cup or other secondary container formed of metal, paper, plastics or other packaging material and simultaneously filled with the flowable material. In another embodiment, the plastic gob is first expanded by means of gas pressure only to make a hollow flexible container and then the flowable material is poured into such preformed container preferably while the plastic bag is supported inside an outer receptacle. A gob may be first formed of the entire amount of film-forming material needed to expand into the liquid enclosing envelope and the introduction of the liquid may occur entirely after the initial formation of the gob. Alternatively, only a part of the needed amount of the film-forming material may be present in the gob at first and during the introduction of the liquid as the gob expands to form the surrounding envelope, the additional film-forming material needed to form the complete full-sized envelope may be continuously supplied to the gob, such as by supplying such film-forming material continuously to an annular area or zone surrounding the area or zone of introduction of the liquid to be packaged.

In either event, when the desired amount of liquid for a given package has been introduced into the plastic bag, the top of the plastic bag is closed about the liquid within by pinching the plastic walls together or in any other fashion, such as by twisting the material at this point.

The present invention provides a simple, efficient and low-cost system for producing packages. The outer receptacle of the package may be formed of any material such as low-cost untreated paper cartons or cups, the main function of the outer receptacle being to confine the inner plastic bag and requiring for this purpose a certain structural strength. The outer receptacle need not be leakproof, since this requirement is completely taken care of by the plastic bag which serves to line the interior of the carton and by its flexibility conforms to the contour of the interior of the receptacle. The receptacle need not be so rigid as to resist all flexing and deformation that may normally occur during handling and shipment since the inner lining is quite flexible and resists rupture when flexing and deformation, caused by normal shocks and impacts and bending forces, are imparted to the package. Because of the cohesive plastic character of the film-forming material, there is no liability that parts of the plastic bag will break off during impact and become deposited within the contents thereof.

The plastic container may be made from a wide variety of thermoplastic materials. Preferred types include the synthetic polymers of thermoplastic character and the elastomeric types. Examples include vinyl resins, such as polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, polyethylene, linear superpolymers of the polyester or nylon (polyamide) type, polyvinyl butyral, polyvinyl alcohols, polyvinyl ethers; elastomeric types may include neoprene, polymers of chloroprene, copolymers of butadiene with styrene or acrylonitrile, polyisobutylene, and so forth. The use of molten thermoplastic material has certain advantages over the use of a plastic containing a volatile solvent because many flowable materials have a tendency to absorb residues of the solvent and thus cause contamination of the material. The present invention relates to the formation and filling of plastic containers without the use of any solvents. It is to be understood that the mentioning of these particular materials is not intended to limit the invention thereto but merely to illustrate the wide variety of film-forming materials that can be used in carrying out the invention. Of course, the selection of any particular material depends upon the character of the liquid to be packaged. Thus, polyvinyl acetate, polyvinyl acetals and polyvinyl alcohols and neoprene, especially the latter two types, are highly advantageous when packaging oils especially of the hydrocarbon type. Polyvinyl acetate, polyvinyl chloride, related copolymers of these two monomers, and polyethylene are particularly adaptable to the packaging of aqueous liquids.

The film-forming material may be converted to a fluid mass by fusion. Thus, any of the thermoplastic materials may be heated to fusion and the liquid to be packaged may be introduced into a gob of the fused material preferably at the same temperature as the fused material. If necessary, the temperature of fusion may be lowered by the incorporation of a plasticizer either of solid or liquid character. When plasticizers are incorporated into the plastic material to form the gob, the plasticizer is preferably insoluble in the liquid to be packaged unless the particular use to which the liquid packaged is to be put allows of the presence of the plasticizer that is used. The cooling of the freshly-formed plastic container may be accomplished by allowing it to cool down normally in the air or by forced chilling by means of a cold gas or liquid or by filling it with the flowable material which is itself at a lower temperature, or by expanding it into a cold outer receptacle. When the expanded envelope strikes the wall of the receptacle, the mass is set into the shape desired conforming with the wall of the receptacle.

It is understood that the plastic container enclosing the flowable material may be used as the sole container therefor and the package so formed will be flexible. Such a plastic package may then be chilled, cooled or frozen for storage, preservation and shipment. Therefore, it must be clearly understood that the invention contemplates broadly the packaging of the flowable material in a flexible plastic seamless container without the use of any secondary supporting receptacle.

Figure 2:
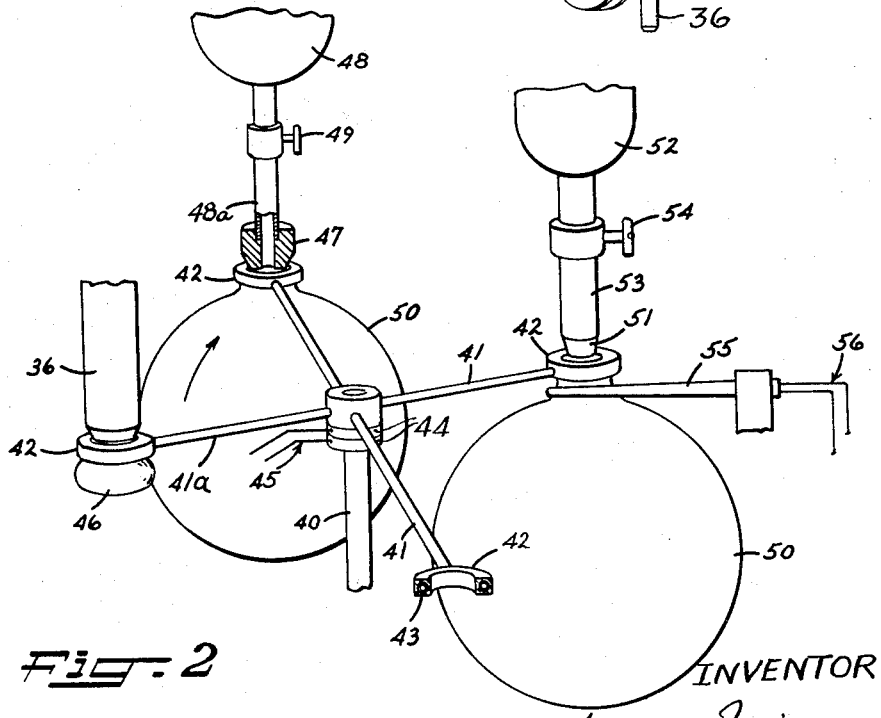
Figure 5:
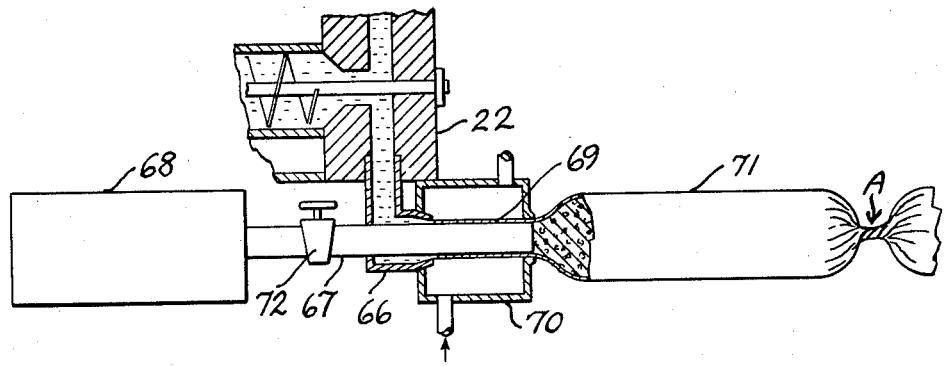
Figures 3, 4:
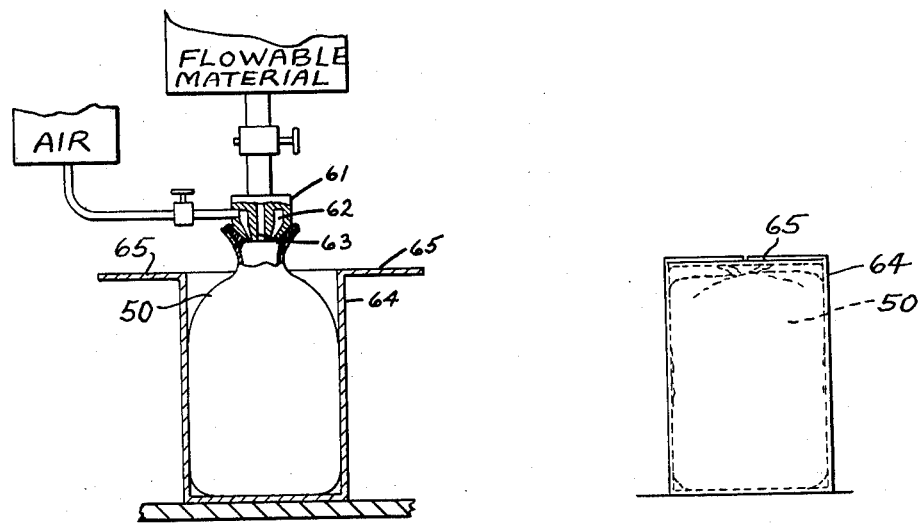

For a more complete understanding of the nature and objects of the invention reference should be had to the accompanying drawings, in which, Fig. 1 is a side elevation, partly in section, of a part of a suitable apparatus for carrying out one embodiment of the process of the invention, Fig. 2 is a perspective view of the container forming and filling devices to be used with the apparatus of Fig. 1 for carrying out the process, Fig. 3 is a side elevation, partly in section, of a second embodiment of the process, Fig. 4 is a side elevation, partly in section, of another embodiment of the package of the invention, Fig. 5 is a side elevation, partly in section, of an apparatus for carrying out a third embodiment of the process.

Generally speaking, the thermoplastic film-forming material is heated to melt the plastic which is then extruded to form a gob, the gob being expanded into a container. For example, a suitable device is shown in Fig. 1 in which the solid thermoplastic material is fed, in the form of flakes, granules, pellets or other comminuted form, into a chamber 10 through the port 11 having a lid 12 and a discharge port 13 communicating with a screw press 14 comprising a cylinder 15 and a single fluted screw 16. The screw press and the chamber 10 are each surrounded by a jacket 17 providing spaces 18 through which heated air or fluid may be circulated to maintain the temperature of the plastic material. In addition, the chamber 10 may be provided with internal heating means such as the pipes 19 connected to the jacket so that the granular material is heated to its melting point and then flows by gravity through the exit port 13 to the screw press 14. The screw 16 is driven by a motor 20 through a suitable gear train 21. The press terminates at the other end in an extrusion head 22 comprising a T-shaped channel having one arm 23 connected through a pipe 24 to a pump 25 such as a metering gear pump common to the rayon industry and a second arm 26 connected through a pipe 27 to an air cylinder 28 having attached thereto a pressure gauge 29 which is adapted to actuate an electric relay 30. The switch 30 is connected by wires 31 to the electric motor 20 so that when the pressure of the molten plastic in the head becomes too great, the switch will cut off the motor and thus momentarily stop the delivery of molten plastic to the gear pump, and when the pressure drops to a desired value the motor will again operate and deliver the molten plastic to the gear pump 25 and increase the pressure on the molten plastic being delivered to the gear pump. The gear pump 25 is driven by a second motor 33 through a gear train 34—34a in which the gear 34a has only a few teeth on its periphery so that the pump is driven intermittently although the motor 33 is operated continuously. If necessary, an inert gas may be introduced into the chamber 10 by means of the pipe 35, the gas sweeping out the air through the port 11.

A suitable device for forming the filling containers with flowable material is shown in Fig. 2 in which the molten plastic is delivered by the gear pump 25 through a nozzle 36. The container former comprises a central shaft 40 having a multiplicity of arms 41 rotatably mounted thereon, each arm terminating in a ring 42 which is internally heated by means of an electric coil or wire 43 connected through the arms to a commutator ring 44 to a source of electric energy through the wires 45. The arms are rotated intermittently so that the arm 41a is first positioned under and closely adjacent the orifice of the nozzle 36 so that it receives a gob of plastic 46. The arm 41a carrying the gob 46 then moves to the container forming position so that it is under and adjacent the nozzle 47 which is connected to a source of gas under pressure such as the gas chamber 48 connected to the nozzle 47 through the pipe 48a having the valve 49 therein. The valve 49 is now turned to open position so that the gas is delivered to the central portion of the plastic suspended on the ring 42 whereupon the gob 46 is rapidly expanded to form a container 50. The arm 41a carrying the container 50 then moves to a filling position so that the ring 42 and the mouth of the container are positioned beneath a nozzle 51 through which flowable material to be packaged is delivered from a supply chamber 52 through a pipe 53 having a valve 54. The arm 41a now moves to a closing position where a heated blade 55 which is heated by suitable means such as the electric wire 56 is located. The blade is stationary so that as the arm 41a swings to the closing position, the blade cuts the container off just below the ring 42, preferably scraping the bottom of the ring. Since the ring is heated, the plastic material adjacent the ring is soft and tacky so that the walls of the container are pressed together and sealed by the heat of the blade 55. The arm 41a now moves to the plastic loading position to receive a second gob of plastic from the nozzle 36.

While Fig. 2 shows a former having four arms, the device may comprise a single arm or a plurality of arms which move successively to the various loading, expanding, filling and sealing positions or zones as above described. If desired, the expanding and filling may be carried out at a single position by use of the composite nozzle 61 shown in Fig. 3, in which the gas is delivered through the annular channel 62 and the flowable material is delivered through the central channel 63. In some cases, where the flowable material is inert at the temperature of the molten plastic, the use of air or gas to expand the plastic may be dispensed with and the flowable material may be used as the means for expanding the plastic gob into a container.

Fig. 3 also illustrates another embodiment of the process, in which the plastic container is formed or filled while it is positioned inside a secondary outer receptacle 64 such as a cup, container, carton or paper, plastic metal, and the like. After the plastic container 50 has been filled, it is closed by pinching together the portions at the top while they are plastic and tacky or the top is heat-sealed or otherwise closed, the receptacle 64 is closed by folding over the flaps 65 and sealing them to form the finished package shown in Fig. 4.

In Fig. 5 there is shown apparatus suitable for forming a continuous tubing or casing of the organic plastic and simultaneously filling it with a flowable material. The molten plastic flows from the press head 22 and is continuously extruded through an annular orifice formed by the tube 66 and an inner pipe 67 which is a stuffing horn connected to a container 68 which may be filled with a flowable material such as frankfurter sausage meat. The plastic tubing 69 is chilled while it passes through the cooling chamber 70 and is stuffed with the meat to form a sausage 71 which may be twisted at spaced points, such as A, to form links. The valve 72 in the horn regulates the flow of meat. It is to be understood that the meat or other flowable material may be fed intermittently to the tubing so that it will be spaced inside the tubing at intervals and the tubing may be sealed in the areas separating the spaced units of meat or other material.

Many variations may be made in the package, for example, the outer receptacle may contain a plurality of separate plastic containers enclosing packaged flowable material.

When packaging milk and other flowable materials in cartons which are already provided with an opening cap, the procedure is to place the milk carton under the nozzle, open the cap, insert the nozzle in the opening, form and fill the plastic container in the carton and then withdraw the nozzle so that the top parts of the plastic container contact and adhere to the edges of the carton opening. Thus, when the cap is forced back over the opening, the carton will be completely sealed. In general, however, it is preferable to close the plastic container by a coalescing of the walls of the plastic container as by pinching them together or twisting them until they are in contact.

If the plastic material is delivered continuously instead of intermittently to the nozzle, the container may be formed as a long seamless tubing which is simultaneously filled as it is formed with the flowable material.

I claim:

1. In packaging apparatus, a vertically journaled hub, a plurality of arms extending from said hub in a horizontal plane, an open annular ring at the tip of each of said arms, a heating element for each of said rings, a nozzle positioned above the orbit of said rings at a first station to deposit a mass of molten thermoplastic material in each of said rings at said station, a second nozzle positioned above the orbit of said rings at a second station for exanding the mass into a hollow container at said second station, a third nozzle positioned above the orbit of said rings at a third station for filling said hollow container at said third station, and a wiper blade positioned adjacent the third station for removing the filled container from the ring.

2. Apparatus in accordance with claim 1 in which the wiper blade is provided with heating means.

3. In packaging apparatus, a movable structure supporting at least one annular member, first means for delivering a gob of plastic material to said annular member when said movable structure is advanced into a first position, means carried by said annular member for maintaining the gob of plastic material in a softened condition, second means for expanding the gob of plastic material into the shape of a hollow container when said movable structure is advanced into a second position, third means for filling the hollow container when said movable structure is advanced into a third position, and fourth means positioned adjacent to said third means for simultaneously sealing and removing the filled containers from said annular member as said movable structure is advanced from its third position.

4. A method for packaging flowable materials including the steps of disposing a gob of plastic material onto an annular member, maintaining said material in a softened condition while simultaneously inflating the same to form a hollow container having an opening at its point of connection with said annular member, filling said hollow container with a flowable material, and sealing said container opening while simultaneously removing said filled container from said annular member.

References Cited in the file of this patent

UNITED STATES PATENTS

| | | |
|---|---|---|
| 2,275,154 | Merrill et al. | Mar. 3, 1942 |
| 2,331,687 | Hobson | Oct. 12, 1943 |
| 2,403,482 | Cloud | July 9, 1946 |
| 2,411,971 | MacMillin et al. | Dec. 3, 1946 |
| 2,427,960 | Griffiths | Sept. 23, 1947 |
| 2,449,139 | Posner | Sept. 14, 1948 |
| 2,566,645 | Weber et al. | Sept. 4, 1951 |
| 2,618,814 | Paton et al. | Nov. 25, 1952 |
| 2,783,599 | Weikert | Mar. 5, 1957 |

OTHER REFERENCES

Blow-moulding, October 1953, British Plastics, page 360.